United States Patent Office 3,293,935
Patented Dec. 27, 1966

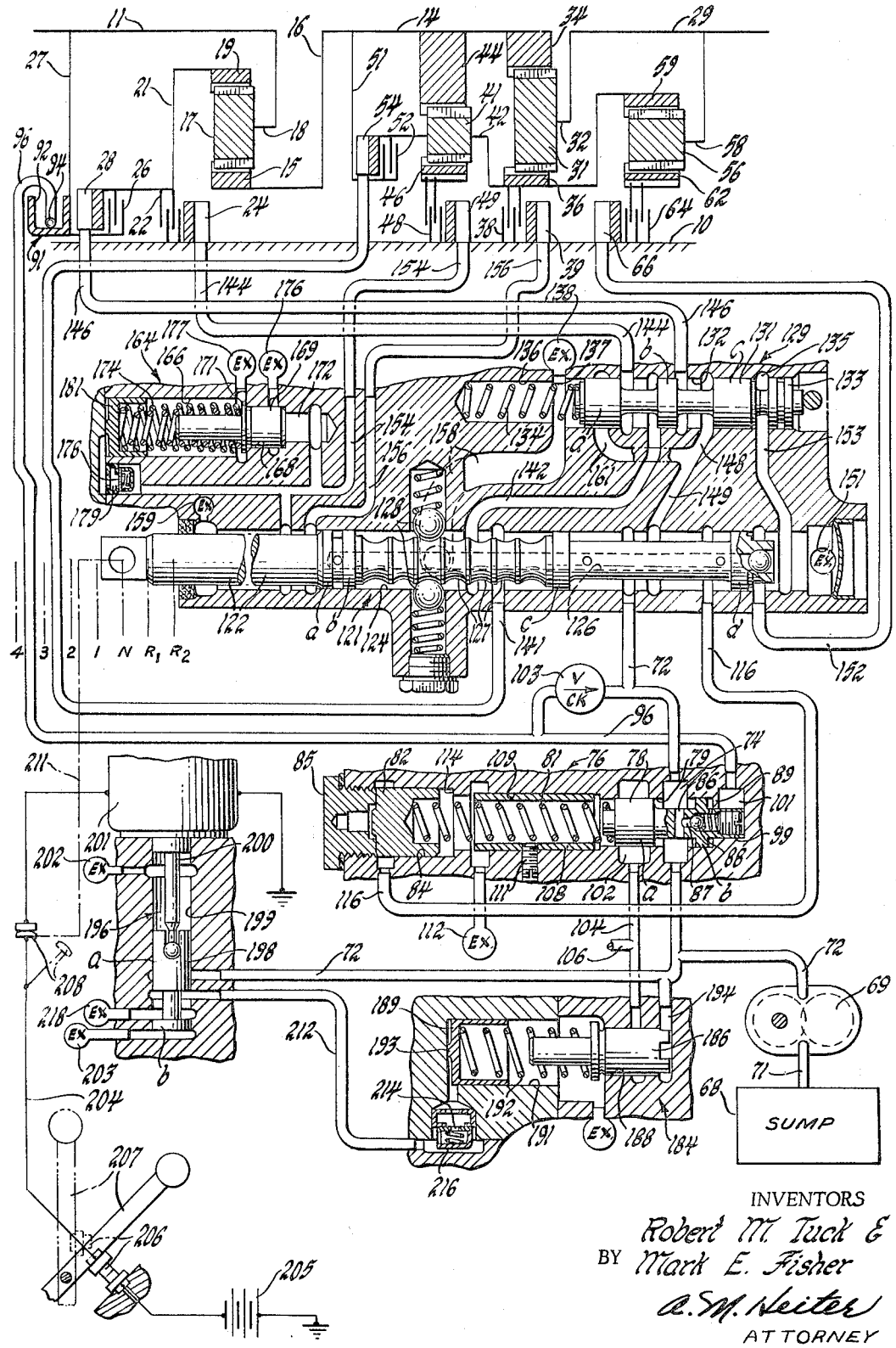

3,293,935
TRANSMISSION CONTROL
Robert M. Tuck, Indianapolis, and Mark E. Fisher, Carmel, Ind., assignors to General Motors Corporation, Detroit, Mich., a corporation of Delaware
Filed July 8, 1963, Ser. No. 293,462
18 Claims. (Cl. 74—472)

This invention relates to a transmission and more particularly to a transmission control system having a fluid pressure control mechanism to control the fluid pressure delivered to engage a drive in the transmission.

The fluid pressure control mechanism as illustrated may be employed in an engine driven torque converter and multi-ratio gear unit transmission of the type shown in the Tuck et al. Patent No. 2,978,928 issued April 11, 1961. The fluid pressure control mechanism which includes a trimmer valve may be employed to control main line or supply line pressure which is normally regulated at the full value by a main line regulator valve and selectively delivered by a selector valve to each of a plurality of drive engaging devices such as fluid operated clutches or brakes to selectively engage a plurality of drive ratios. The trimmer valve is controlled to regulate main line pressure at a reduced or low value when the selector valve is in neutral and the engine throttle is closed and gradually increases main line pressure to the full value when either the selector valve is moved from neutral to a drive position or the engine throttle is moved from a closed to an open throttle position. In the embodiment illustrated the trimmer valve is connected to the main line and permits exhaust at a low pressure when the selector valve is in neutral and the engine throttle is in the closed throttle position. When either the selector valve is moved from neutral to a drive position or the engine throttle is moved from the closed to an open throttle position, a normally closed solenoid operated control valve controlled by the selector valve and engine throttle is opened to deliver pressure from the main line through a restricted control orifice in a check valve to act on a control piston which gradually increases the biasing force acting on the trimmer valve. The trimmer valve gradually increases main line pressure to its full value over an extended period of time whereafter the main line regulator valve is effective to regulate main line pressure at the full value. Thus, upon movement of the selector valve from neutral to a drive position and provided that the engine throttle has not been previously moved to an open throttle position, the pressure supplied for drive engagement is gradually increased by the trimmer valve to avoid sudden and jarring drive engagement. In the event that the engine throttle is moved to the open throttle position prior to movement of the selector valve from neutral to a drive position, upon movement of the selector valve from neutral to a drive position full main line pressure may be supplied to the selected drive engaging device. This limits slipping of the clutch or brake being engaged and acts to prevent excessive wear when the differential speed between the members of the clutch or brake is large because of the engine throttle being opened, that is, the engine is turning faster than idle speed. The pressure acting on the control piston to increase the biasing force acting on the trimmer valve can exhaust rapidly to an exhaust passage when the solenoid operated control valve is closed because of the opening of the check valve having the restricted orifice. Thus, the trimmer valve is quickly reset for another cycle.

An object of the invention is to provide a fluid control system for engaging a drive in an engine driven transmission, fluid pressure control means responsive to selector valve and engine throttle positions to selectively regulate the main line pressure at a value lower than full main line pressure and to gradually increase main line pressure from the low value to the full value.

Another object of the invention is to provide in a fluid control system for engaging a drive in an engine driven transmission, fluid pressure control means operative to selectively establish a low regulated main line pressure prior to delivery via a selector valve to a drive engaging device and opening of the engine throttle and upon either initial delivery of fluid presure to the drive engaging device or opening of the engine throttle gradually increasing main line pressure over an extended period of time until full main line pressure is obtained.

Another object of the invention is to provide in a fluid control system for engaging a drive ratio in an engine driven transmission, a fluid pressure control mechanism responsive to selector valve and engine throttle positions to override a main line regulator valve to regulate main line pressure at a low value prior to either delivery of main line pressure to drive engaging device or the opening of the engine throttle and upon movement of either the selector valve from neutral to a drive position or movement of the engine throttle from a closed position to an open position to gradually increase main line pressure until full main line pressure is obtained whereafter main line pressure is regulated at the full value by the main line regulator valve.

Another object of the invention is to provide a fluid control system for engaging a drive ratio in an engine driven transmission, a selector valve for delivering main line pressure to a drive engaging device and fluid pressure control means for establishing a low regulated main line pressure when a drive ratio is not engaged and the engine throttle is closed and being operable in response to an electrical signal controlled by either the engine throttle or a selector valve to gradually increase the pressure to full main line pressure.

Another object of the invention is to provide in a fluid control system for engaging a drive in a transmission which is adapted to be driven by an engine having a throttle, a selector valve for deliverying main line pressure to a drive engaging device, and a main line regulator valve for regulating full main line pressure, a spring biased trimmer valve connected to the main line and a solenoid operator control valve responsive to electrical signals controlled by the positioning of the selector valve and engine throttle to control the passage of fluid pressure from the main line through a control orifice to a control piston associated with the trimmer valve to control the bias acting on the trimmer valve whereby main line pressure is regulated at a low valve when the selector valve is in neutral and the engine throttle closed and upon movement of either the selector valve from neutral to a drive ratio position or movement of the engine throttle from the closed to an open position, pressure is deliverd by the solenoid operated control valve through the orifice to the control piston to increase the bias on the trimmer valve to gradually increase the main line pressure to full main line pressure whereafter the main line regulator valve regulates main line pressure at the full value.

These and other objects of the invention will be more apparent from the following description of the preferred embodiment of the invention illustrated in the accompanying drawing in which:

A schematic view of the transmission and control system is shown.

The invention is illustrated in a torque converter and multi-ratio gear unit transmission which is of the type shown in detail in the Tuck et al. Patent No. 2,978,928 and includes a stationary transmission housing 10 housing a converter or turbine shaft 11 which is connected by a two speed splitter gear unit providing low ratio or direct drive and high ratio or overdrive to intermediate shaft 14. The splitter gear unit has a ring gear 15 connected by drum 16 to drive the intermediate shaft 14 and meshing with the planetary pinions 17 mounted on the carrier 18 which is connected to and driven by the converter shaft 11. The sun gear 19 meshes with the pinions and is controlled to provide the two drives through the control hub 21 which, for high ratio or overdrive, is held stationary by the brake 22 which consists of a plurality of plates attached alternately to the control hub 21 and the transmission housing 10 and is engaged by the splitter high or overdrive motor 24. To provide low ratio or direct drive, the control hub 21 is connected to converter shaft 11 to lock up this gear unit by clutch 26 having alternate plates attached to the control hub 21 and the clutch hub 27 which is connected to and driven by converter shaft 11 and this clutch is actuated by the splitter low or direct drive fluid motor 28.

The main gear unit provides low, intermediate, high and reverse drive ratios. The low ratio drive is provided between the intermediate shaft 14 and the output shaft 29 by the low planetary gear set consisting of a plurality of planetary pinions 31 mounted on a carrier 32 connected to the output shaft 29 and meshing with the driving sun gear 34 which is fixed to the intermediate shaft 14 and with the control ring gear 36. The ring gear 36 is controlled by a brake 38 consisting of alternate plates attached to the ring gear and the transmission housing 10 which are engaged by the low fluid motor 39 to hold the ring gear for low ratio on the supply of fluid to this motor.

Intermediate ratio in the main gear unit is provided by the intermediate and low gear sets. The intermediate gear set has pinions 41 mounted on a carrier 42 connected to the ring gear 36 and the pinions mesh with a sun gear 44, larger than sun gear 34, driven by the intermediate shaft 14 and the controlled ring gear 46. To provide intermediate ratio, the ring gear 46 is held by the brake 48 consisting of alternate plates attached to the ring gear 46 and the transmission housing 10 and engaged by the intermediate fluid motor 49 to drive the ring gear 36 of the low gear set so the combined gear sets provide an intermediate ratio.

High ratio in the main gear unit is a direct drive provided by locking up this gear unit. Intermediate shaft 14 is connected to the clutch hub 51 and connectible by the high clutch 52 to the carrier 42. The high clutch fluid motor 54 is supplied with fluid to engage the high clutch 52 to cause the intermediate shaft 14 and carrier 42 to rotate together to lock up the main gear unit for direct drive or high.

Reverse ratio is provided by the reverse gear set which has a plurality of pinions 56 rotatably mounted on a carrier 58 connected to drive the output shaft 29. The pinions mesh with a sun gear 59 connected to rotate with ring gear 36 and mesh with the ring gear 62. The brake 64 for controlling the ring gear 62 consists of alternate plates attached to the ring gear and the transmission housing 10 and is actuated by the reverse fluid motor 66 to hold the ring gear to provide reverse drive in the main gear unit.

In the two speed splitter gear unit, either the splitter low motor or the splitter high motor is supplied with fluid to selectively provide either low ratio (direct) drive or high ratio (overdrive) drive in the splitter gear unit, and the other motor is connected to exhaust. In the main gear unit, fluid is selectively supplied to one of the low, intermediate, high and reverse motors and the others are exhausted to provide the selected one of low, intermediate, high and reverse ratios. When the main gear unit is in low, the splitter gear unit may be engaged in low or high ratio drive and respectively provides first and second forward drive ratios. Similarly, with intermediate ratio engaged in the main gear unit, low and high ratio drive in the splitter gear unit provide third and fourth forward drive ratios. With high in the main gear unit, splitter low and splitter high provide fifth and sixth forward drive ratios. When the main gear unit is in reverse, splitter low and splitter high provide first and second drive ratios. Though this gearing can provide six forward drive ratios and two reverse drive ratios, the controls are arranged so that only four forward drive ratios and two reverse drive ratios are provided. Each of the fluid actuated ratio engaging friction devices consisting of a motor for actuating a ratio engaging clutch and brake is provided with suitable retraction springs, not shown, to disengage each clutch and brake on exhausting the control line. The clutches and brakes are engaged by supplying fluid via the control lines to the motors for selectively engaging each of the brakes and clutches or fluid operated drive engaging devices.

Control system

The hydraulic control system for this transmission provides for the manual selection of four forward drive ratios and two reverse drive ratios. The four forward drive ratios are obtained by employing in combination with direct drive in the splitter gear unit low, intermediate and high ratio in the main gear unit and by employing overdrive in the splitter gear unit in combination with high ratio or direct drive in the main gear unit. The two reverse drive ratios are obtained by employing in combination with reverse ratio in the main gear unit either direct drive or overdrive in the splitter gear unit.

Main line regulator valve

The fluid which exhausts from the various exhaust ports Ex, the lubrication system and other leakage collects in the sump 68. Fluid is supplied to the control system by an input driven pump 69 driven by the converter shaft 11 which draws fluid from the sump line 71 and delivers the fluid through to the main line or supply 72 which is connected to port 74 of the main line regulator valve 76.

The regulator valve element 78 has lands $a$ and $b$ of equal diameter located in the bore 79 and is normally biased to the position shown by a spring 81 between the valve element and a movable control piston 82 which is mounted in a counterbore 84 and in abutting relationship with an end plug 85. The main line 72 is always connected to port 74 to continuously supply the space between lands $a$ and $b$ and this space is always connected by passage 86 to passage 87 which has a check valve 88 therein permitting flow of fluid from the port 74 to the bore 79 between the land $b$ and the end wall 89 of the bore 79. The fluid in the bore acts on the unbalanced area of land $b$ so that the regulator valve regulates the pressure in the main line. The check valve 88 in cooperation with a small clearance between the land $b$ and the bore 79 damps the action of the regulator valve and is more fully explained in application Serial No. 551,068 filed December 5, 1955 by Ulysses A. Breting and Robert M. Tuck now United States Patent 3,033,333.

The pitot governor 91 has an annular trough 92 which is fixed to rotate with clutch hub 27 and filled with fluid from a suitable source such as from the main line as will be described below. The fluid is retained in the trough by centrifugal force and the fluid rotates with the trough toward the open end of the pitot tube 94 to provide in the pitot governor line 96 a governor pressure proportional to the speed of converter shaft 11. A reduced portion 99 of the valve element 78 extends through an aperture in wall 89 into a chamber 101 communicating with the pitot governor line 96 so that the governor pressure acts on the valve element to decrease main line pressure with increasing governor pressure. A check valve 103 located between the main line 72 and the governor line 96 prevents governor pressure from exceeding the main line pressure by exhausting governor pressure to the main line when governor pressure exceeds main line pressure. This is effective as a safety measure to prevent excessive pitot governor pressure at high speeds and to limit the reduction of main line pressure as explained below. As main line pressure in main line 72 increases, the valve element 78 will be moved to the left to exhaust fluid to port 102 which is connected by line 104 and branch line 106 in a conventional manner to lubricate the transmission, to supply the torque converter and to supply fluid to fill the pitot governer trough 92.

Movement of valve element 78 is limited by a sleeve 108 which is fixed in a counterbore 109 by a screw 111. Screw 111 is fixed in the body of the main line regulator valve and extends into a hole in the sleeve to prevent valve element portion 99 from moving out of the aperture in wall 89 which would interconnect main line 72 and pitot governor line 96. The exhaust 112 always connects the space betwen control piston 82 and the valve element 78 to exhaust. The control piston 82 is capable of limited movement between end plug 85 and shoulder 114 and is moved from the position shown by fluid supplied from the signal line 116. When the transmission is operating in the first forward drive ratio, neutral and both reverse drive ratios, the control piston 82 may be moved as will be subsequently described from the position shown to abut shoulder 114 to increase the spring force acting on the valve element 78 by a limited amount to provide pressure regulation at a higher level.

*Manual selector valve*

The main line 72 supplies regulated pressure to the manual selector valve 121 which has a valve element 122 having lands *a*, *b*, *c* and *d* of uniform diameter located in a bore 124. Valve element 122 has a central passage 126 connecting the space between lands *c* and *d* with the space between lands *a* and *b* and a plurality of grooves 127 cooperating with a ball detent mechanism 128 to resiliently position the valve in each of the four forward drive ratio positions, neutral and two reverse drive ratio positions.

*Relay valve*

The manual selector valve 121 operates in conjunction with the relay valve 129 to supply fluid to the clutches of the two speed splitter gear unit. Relay valve 129 has a valve element 131 having lands *a*, *b* and *c* of uniform diameter located in a bore 132 which is closed by the end plug 133. At the left-hand end of the valve element 131, a spring 134 is located in a spring chamber portion 136 of the bore to urge the valve to the position illustrated where it abuts with end plug 133. A fluid chamber 135 at the other end of the valve when supplied with fluid moves the valve to the second reverse drive ratio or R2 position. The spring chamber portion 136 is smaller than bore 132 to provide a shoulder 137 limiting movement of the valve element 131 and has an exhaust 138 to prevent the accumulation of fluid in the spring chamber portion 136.

The manual selector valve 121 and the relay valve 129 function together to supply fluid in accordance with the position of the manual selector valve to the proper motors to condition the transmission for drive in the selective ratio. When the manual selector valve 121 is in the fourth forward drive ratio position, the main line 72 is connected between lands *c* and *d* of valve element 122 to the high ratio line 141 and the splitter gear unit overdrive supply line 142 which is connected to the relay valve 129 between the lands *a* and *b* of valve element 131 to the splitter gear unit overdrive ratio line 144. The other ratio lines are exhausted. The splitter gear unit direct drive ratio line 146 is connected between the lands *b* and *c* of valve element 131 to a branch 148 of the splitter gear unit supply line 149 and through the bore 124 to the right of valve element 122 to exhaust 151. The signal line 116, the reverse ratio line 152 and the second reverse drive relay line 153 are also connected through the bore 124 to exhaust 151. The intermediate ratio line 154 and the low ratio line 156 are connected between the lands *b* and *c* of the valve element 122 through the bore 124 to the exhaust line 158 which is connected to exhaust 138.

In the third forward drive ratio position, the manual selector valve 121 connects the main line 72 between the lands *c* and *d* of valve element 122 to the high ratio line 141 and the splitter gear unit supply line 149 which is connected via branch 148 between the lands *b* and *c* of valve element 131 to the splitter gear unit direct drive ratio line 146. The signal line 116, reverse ratio line 152 and the relay line 153 remain connected through the bore 124 to exhaust 151. The intermediate ratio line 154, low ratio line 156 and splitter gear unit overdrive supply line 142 are connected between the lands *b* and *c* of manual valve element 122 to exhaust line 158.

In the second forward drive ratio position, the manual selector valve 121 connects the main line 72 between the lands *c* and *d* of valve element 122 to the splitter gear unit supply line 149, which as in the third forward drive ratio continues to supply fluid to the splitter gear unit direct drive ratio line 146 and also supplies fluid to the internal passage 126 of valve element 122 and the space between the lands *a* and *b* to intermediate ratio line 154. The low ratio line 156, the splitter gear unit line 141 are connected to the exhaust line 158 while the overdrive ratio line 144 via line 142 and the high ratio signal line 116, reverse line 152 and relay line 153 are connected to the exhaust 151.

In the first forward drive ratio position, the main line 72 remains connected between the lands *c* and *d* of valve element 122 and lands *b* and *c* of relay valve element 131 to the splitter gear unit direct drive ratio line 146 and supplies the signal line 116. Fluid also flows through the internal passage 126 in valve element 122 in the space between the lands *a* and *b* to the low ratio line 156. In this valve position, intermediate ratio line 154 is connected to the exhaust 159, the splitter gear unit overdrive ratio line 144 and the high ratio line 141 are connected to exhaust line 158, and the reverse ratio line 152 and relay line 153 are connected to exhaust 151.

When the manual selector valve 121 is in the neutral position shown, the main line 72 supplies fluid between the lands *c* and *d* to the signal line 116 and the splitter gear unit supply line 149 which continues to supply through the relay valve 129 the splitter gear unit direct drive ratio line 146. Since all the main gear unit ratio lines are exhausted, the main gear unit provides neutral. The intermediate ratio line 154 and low ratio line 156 are vented at exhaust 159, the splitter gear unit overdrive ratio line 144 and high ratio line 141 are vented by exhaust line 158, and the reverse ratio line 152 and relay line 153 are vented at exhaust 151.

In the first reverse drive ratio or R1 position, the manual selector valve 121 connects the main line 72 between the lands *c* and *d* of valve element 122 to the signal line 116, the reverse ratio line 152 and the splitter gear unit supply line 149 which is still connected by the relay valve 129 to the splitter gear unit direct drive ratio line 146. The other lines are connected to exhaust, to wit, the intermediate ratio line 154 and low ratio line 156 to exhaust 159, the splitter gear unit overdrive ratio line 144 and high ratio line 141 to exhaust line 158 and the relay line 153 to exhaust 151. In the second reverse drive ratio or R2 position the manual selector valve 121 connects the main line 72 between the lands *c* and *d* of valve element 122 to the signal line 116, the reverse ratio line 152, the relay line 153 and the splitter gear unit supply line 149. The relay line 153 is connected to the chamber 135 at the right end of the relay valve 129 and shifts the relay valve to the overdrive position in which fluid in the splitter gear unit supply line 149 is blocked at branch 148 by the land *c* and connected at branch 161 between the lands *a* and *b* to the splitter gear unit overdrive ratio line 144. The splitter gear unit direct drive ratio line 146 is then connected between the lands *b* and *c*, splitter gear unit overdrive supply line 142 and between lands *b* and *c* of valve element 122 to exhaust lines 158. The intermediate and low ratio lines 154 and 156 are connected to exhaust 159, and the high ratio line 141 is connected to exhaust line 158.

Intermediate ratio trimmer valve

The intermediate ratio line 154 is controlled by intermediate ratio trimmer valve 164 to provide the initial low pressure for initial stage of intermediate ratio establishing device application and a gradual increase in pressure to a final pressure equal to full main line pressure to gradually engage this drive. The trimmer valve 164 has a stepped bore having a large portion 166 and a small portion 168 with a valve element 169 located in the small bore portion 168. The shoulder 171 of valve element 169 engages the shoulder between the large and small bore portions so that the valve element 169 will not engage the right end of the bore portion 168. The intermediate ratio line 154 is connected to a chamber 172 at the right hand end of the bore portion 168 and this fluid acts on the end of valve element 169 to urge the valve against the springs 174 to move the valve from the closed position shown to an open position connecting intermediate ratio line 154 to exhaust 176 to reduce the pressure in intermediate ratio line 154 to the value regulated by the springs 174. The bore portion 166 is provided with an exhaust 177 to prevent the accumulation of oil in the bore interfering with the operation of the valve. The intermediate ratio line 154 is also connected through an orifice 178 in the check valve 179 to the left hand end of bore portion 166 where it acts on the control piston 181 to move the piston 181 to the right to increase the spring force or bias acting on valve element 169 and the pressure in the intermediate ratio line 154. When the intermediate ratio line 154 is exhausted, the fluid acting on the piston 181 is exhausted rapidly from the end of bore portion 166 through the check valve 179 to position the valve element 169 for a subsequent intermediate clutch application.

Neutral trimmer valve

The neutral trimmer valve 184 functions to regulate pressure in main line 72 at a low pressure value lower than full main line pressure when the manual selector valve 121 is in the neutral position and the engine throttle of the engine which is driving the transmission is on the closed throttle position and gradually increases main line pressure to its full value when either the manual selector valve element 122 is moved from neutral to the first forward or first reverse drive ratio positions, or the engine throttle is moved from closed to an open throttle position. The neutral trimmer valve 184 has a valve element 186 located in a small diameter bore portion 188 in the trimmer valve body and a control piston 189 located in the larger diameter bore portion 191 in the valve body. The control piston 189 and the valve element 186 are urged by a spring 192 toward opposite ends of the closed bore 188–191. The piston 189 has a projection 193 which abuts with the end of bore portion 191 to prevent the total surface area of the left end face of the piston from contacting the end of this bore. The main line 72 is connected to a chamber 194 at the right hand end of bore portion 188 and main line pressure acts on the end of valve element 186 to move the valve from the closed position shown to an open position connecting main line 72 to line 104 and branch line 106 to reduce main line pressure to the value regulated by spring 192 seated on the control piston in the low pressure position. Main line 72 is also connected to a solenoid operated control valve 196 which has a valve element 198 having lands *a* and *b* of equal diameter located in the bore 199. Movement of valve element 198 is effected by the plunger element 200 connecting the valve element to the solenoid 201 and exhausts 202, 203 prevent the accumulation of fluid in bore 199 above and below the valve element. The electrical circuitry 204 of the solenoid 201 has a suitable electrical power source 205, a throttle switch 206 operated by the engine throttle hand lever 207 or other suitable engine throttle linkages controlling the engine, not shown, and a neutral switch 208 operated through suitable linkage 211 by manual selector valve element 122.

The throttle switch 206 is movable with lever 207 from the closed position shown in solid lines which corresponds to the closed engine throttle position to an open position when the lever is moved from the closed throttle position towards the fully open throttle position shown in dashed lines. The neutral switch 208 is movable through linkage 211 by the selector valve element 122 from the closed position shown in solid lines which corresponds to neutral in the transmission to an open position such as shown in dashed lines when the selector valve element 122 is moved from neutral to either the first forward or first reverse drive ratio position. Neutral switch 208 remains open on a subsequent upshift or downshift.

When the manual selector valve element 122 is in the neutral position shown and the engine throttle had lever 207 is in the closed throttle or engine idling position, the neutral switch 208 and throttle switch 206 are closed as described above and complete the circuit 204. With the switches 206 and 208 closed, the solenoid 201 is energized to move the control valve element 198 to the closed position shown where the land *a* prevents fluid in main line 72 from communicating with the neutral trimmer valve signal line 212 which is connected through a fixed area control orifice 214 in the check valve 216 to the left hand end of bore portion 191. In this control valve position, signal line 212 is connected between lands *a* and *b* of control valve element 198 to exhaust 218. The ratio of the spring force of spring 192 biasing the neutral trimmer valve element 186 to the effective unbalanced area or area of the right end face of the neutral trimmer valve is selected to be less than the ratio of the spring force of spring 81 biasing the main line regulator valve element 78 including the limited additive bias provided by the pressure in line 116 acting on control piston 82 to the effective unbalanced area or area of land *b* of the main line regulator valve element and since only the spring force of spring 192 resists movement of the neutral trimmer valve element 186 to the left when the manual selector valve element 122 is in the neutral position and the engine throttle is in the closed throttle position, the signal line 212 being connected to exhaust 218, the neutral trimmer valve 184 overrides the main line regulator valve 76 to regulate main line 72 at the low regulated pressure of spring 192 which is lower than the full main line regulated pressure.

When either the manual selector valve element 122 is moved from neutral to the first forward drive ratio position or reverse drive ratio position, or the engine throttle is moved from the closed throttle position to an open throttle position, either the neutral switch or throttle switch is opened respectively and the solenoid 201 is de-energized. A return spring (not shown) in the solenoid then acts through the plunger element 200 to move the control valve element 198 upward to an open position connecting main line 72 between lands *a* and *b* of control valve element 198 to signal line 212. The volume of flow from signal line 212 through orifice 214 is proportional to the pressure in signal line 212 which is at main line pressure and the time during which the pressure is present. The fluid flow through the orifice 214 creates a pressure in the bore portion 191 acting on the control piston 189 to move the piston to the right to add to and gradually increase the force of spring 192 acting on the neutral trimmer valve element 186 and thus gradually increase the pressure in main line 72. The maximum additive force available to the neutral trimmer valve by the controlled pressure acting on control piston 189 is selected to be greater than the maximum additive force available to the main regulator valve by the pressure in line 116 acting on control piston 82 by reason of the latter's movement being limited by shoulder 114 so that as main line pressure increases from the low regulated value, the ratio of the spring force of spring 192 plus now the additive bias provided by the controlled pressure acting on control piston 189 to the effective unbalanced area of the neutral trimmer valve element 186 gradually approaches and finally exceeds the ratio of spring the force of spring 81 which is limited by shoulder 114 plus the additive bias provided by pressure in line 116 acting on control piston 82 to the effective unbalanced area of the main line regulator valve element 78 and upon exceeding the latter ratio neutral trimmer value being thereby overridden by the main line regulator valve which then becomes effective to regulate main line pressure at the maximum value available in either neutral, first forward or first reverse drive ratios.

Thus, if the engine throttle remains closed and the manual selector valve is moved from neutral to either the first forward or first reverse drive ratio position, the drive engagement occurring after the selected drive engaging motor is filled is effected at a pressure above the low regulated pressure regulated by the neutral trimmer valve with the pressure gradually increasing over a substantial period of time for soft drive engagement.

Since the signal line 212 is connected to main line 72 in all forward drive ratio positions and reverse ratio positions, the neutral trimmer valve 184 is non-operative during all shift transitions except from neutral and only overrides the control of the main line regulator valve 76 when the manual selector valve is in neutral.

Soft drive engagement may be prevented in the event that the engine throttle is moved from the closed to an open throttle position prior to movement of the manual selector valve from neutral to either the first forward drive ratio position or first reverse drive ratio position and held in the open throttle position for a period of time sufficient to permit pressure through orifice 214 to increase the bias on the trimmer valve to raise main line pressure to full main line pressure or for a time sufficient for the pressure in main line 72 to be closely approaching full main line pressure. Then upon movement of the manual selector valve from neutral to either the first forward drive ratio position or first reverse drive ratio position either full main line pressure or a pressure closely approaching full main line pressure is supplied for drive engagement. This limits slipping during drive engagement to prevent excessive wear when the differential speed between the friction members being engaged is large because of the engine throttle being opened, that is, the engine is turning faster than idle speed.

When the manual selector valve 121 is returned from either the first forward drive ratio position or first reverse drive ratio position to neutral and the engine throttle is returned from the open throttle position to the closed throttle position, the neutral switch and throttle switch are closed and the solenoid 201 is energized to return the control valve element 198 against the force of the return spring of the solenoid to the position shown. The fluid in the bore portion 191 of the neutral trimmer valve 184 is expelled by the spring 192 and quickly passes through the one way check valve 216 to the signal line 212 and then between the lands $a$ and $b$ of control valve element 198 to exhaust 218 so that the neutral trimmer valve 184 is quickly conditioned for another cycle.

The manual and automatic controls for this transmission function to provide selection of four forward drive ratios and two reverse drive ratios and include neutral trimmer valve control which overrides the main line regulator valve to control main line pressure when both the manual selector valve is in neutral and the engine throttle is closed. The manual selector valve 121 in combination with relay valve 129 as explained in detail above in fourth forward drive ratio supplies fluid to the splitter gear unit overdrive ratio line 144 and to the high ratio line 141 of the main gear unit to provide a drive combining overdrive of the splitter gear unit and high of the main gear unit. In the third forward drive ratio position, the high ratio line 141 remains engaged and the direct drive device of the splitter gear unit is supplied by line 146 to provide a ratio combining direct drive in the splitter gear unit and high ratio in the main gear unit. In the second and first forward drive ratios, direct drive in the splitter gear unit remains engaged. The intermediate brake is engaged by line 154 in second forward ratio and the low brake by line 156 in first forward ratio. In neutral, though direct drive in the splitter gear unit remains engaged, all ratios in the main gear unit are disengaged. In the first reverse drive ratio, the direct drive in the splitter gear unit is engaged and the reverse brake in the main gear unit is engaged by fluid supplied by line 152. In the second reverse drive ratio, the reverse brake remains engaged and the overdrive in the splitter gear unit is engaged. When the manual selector valve is in the first forward ratio, neutral and first reverse drive ratio positions, a signal pressure is provided in line 116 which is connected to the main line regulator valve and provided that the neutral trimmer valve control is non-operative acts to change the position of the control piston 82 to move it from the normal position abutting the end plug 85 and move it against the stop shoulder 114 to increase the force of spring 81 on the valve element 78 to regulate the main line pressure in main line 72 in a higher range of values. Since the pitot governor is driven by the converter shaft 11 supplies pressure via line 96 to the chamber 101 where it acts on the reduced portion 99 in the valve element 78 to counteract the spring force acting on the valve, the main line pressure is reduced in proportion to increasing converter shaft speed or governor pressure. When, as the converter shaft speed increases, the main line pressure is reduced and the governor pressure increased to a substantially equal value, valve 103 opens connecting these pressures and both remain constant at higher speeds, preventing an excessive rise in governor pressure and excessive reduction in main line pressure. The modulation of main line pressure by governor pressure provides a main line pressure which is a maximum at stall where the torque ratio of the converter is high and a minimum at high speeds of the converter shaft where the torque ratio is less to reduce pumping and sealing losses and promote increased efficiency and durability.

In moving the manual selector valve 121 from neutral to either the first forward drive ratio position or first reverse drive ratio position and provided that the engine throttle is closed, the neutral trimmer valve 184 is effective to regulate the main line pressure at a value lower than that normally maintained by the main line regulator valve 76, thus, overriding the control of the main line regulator valve. When the manual selector valve is moved from neutral to either first forward drive ratio position or the first reverse drive ratio position and provided that the engine throttle remained closed prior to this shift, the main line pressure will be gradually increased as the drive is engaged to full main line pressure. After full main line pressure is reached the main line regulator valve 76 becomes effective to regulate main line pressure and the signal line 116 is effective to increase the bias on the valve element 78 to regulate the main line pressure in the higher range of values. Since the neutral trimmer valve control only overrides the main line regulator valve 76 when the manual selector valve is in neutral and the engine throttle is closed, there is only provided a gradual drive engagement when the manual selector valve is moved from neutral to the first forward drive ratio position or first reserve drive ratio position provided that the engine throttle has not been previously opened and the neutral trimmer valve thereby rendered non-operative for the shift. During all transitions of the manual selector valve between the forward drive ratio positions and between the reverse drive positions the neutral trimmer valve is non-operative since the control valve 196 remains open. When the manual selector valve 121 is moved from the neutral to either the first forward drive ratio position or the first reverse drive ratio position and provided that the engine throttle is closed, there occurs either first forward drive ratio or first reverse drive ratio engagement after the selected drive engaging motor is initially filled at a varying pressure which is above the initial low value regulated by the neutral trimmer valve and which gradually increases to full main line pressure. Thus, either first forward drive ratio or first reverse drive ratio is engaged at a transient pressure which gradually increases to provide soft engagement.

The above-described preferred embodiment is illustrative of the invention and it will be appreciated that it may be modified within the scope of the appended claims.

We claim:
1. In a transmission,
 (a) a fluid operated drive engaging device,
 (b) a source of fluid under pressure,
 (c) supply line means connected to said source, first valve means for regulating the pressure in said supply line means in a high pressure range,
 (d) means including selector valve means selectively operatively connecting said supply line means to said device,
 (e) and second valve means selectively operatively controlled by said selector valve means effective to interrupt the pressure regulation by said first valve means and to regulate the pressure in said supply line means in a low pressure range when said supply line means and device are disconnected, and upon connection to gradually increase the pressure until a pressure value effective to establish full drive engagement is obtained and to re-establish the pressure regulation by said first valve means, so that the pressure initially supplied to said device for initial drive engagement is a transient pressure which is gradually increasing to the high pressure to gradually and softly engage said drive engaging device.

2. In a transmission,
 (a) a fluid operated drive engaging device,
 (b) a source of fluid under pressure,
 (c) supply line means connected to said source,
 (d) means including selector valve means selectively operatively connecting said supply line means to said device,
 (e) trimmer valve means to regulate the pressure in said supply line means at a predetermined low value when said supply line means and device are disconnected,
 (f) said valve means including fluid controlled variable rate biasing means responsive to fluid pressure to gradually vary its bias,
 (g) and control valve means operated by a solenoid controlled by said selector means selectively operatively connecting said variable rate biasing means to said supply line means so that when said line means is connected to said device, said solenoid operates said control valve means to connect the pressure in said supply line means to said variable rate biasing means, whereby said variable rate biasing means is effective in response to pressure in said supply line means to increase the bias acting on said trimmer valve means to gradually increase the pressure in said supply line means until a pressure effective to establish full drive engagement is obtained to gradually and softly engage said drive engaging device.

3. In a transmission,
 (a) a fluid operated drive engaging device,
 (b) a source of fluid under pressure,
 (c) supply line means connected to said source,
 (d) means including selector valve means selectively operatively connecting said supply line means to said device,
 (e) trimmer valve means having a movable element,
 (f) means to connect said supply line means to said trimmer valve means to supply fluid to urge said movable element to move in one direction,
 (g) biasing means providing a low biasing force to urge said movable element to move in the opposite direction,
 (h) said trimmer valve means having vent means operative in response to movement of said movable element in said one direction by said fluid from said supply line means to vent said supply line means and to movement in said opposite direction by said low biasing force to close said vent means to regulate the pressure in said supply line means at a low value when said supply line means and device are disconnected,
 (i) bias control means operatively connected to said biasing means,
 (j) control valve means operated by a solenoid which is controlled by said selector valve means operatively connecting said bias control means to said supply line means when said selector valve means connects said supply line means to said device,
 (k) and said bias control means being responsive to a pressure proportional to the pressure in said supply line means when said supply line means and device are initially connected to provide a continuous, gradual change of said biasing force over an extended period of time to change said biasing force from said low biasing force to another biasing force to gradually change the pressure in said supply line means from said low value to a high value effective to establish full drive engagement over said extended period of time to supply pressure to said device at a gradual pressure change until said high value is obtained to gradually and softly engage said drive engaging device.

4. In a transmission,
 (a) a fluid operated drive engaging device,
 (b) a source of fluid under pressure,
 (c) supply line means connected to said source,
 (d) means including selector valve means selectively operatively connecting said supply line means to said device,
 (e) trimmer valve means having a movable element,
 (f) means to connect said supply line means to said trimmer valve means to supply fluid to urge said movable element to move in one direction,
 (g) biasing means providing a low biasing force to urge said movable element to move in the opposite direction,
 (h) said trimmer valve means having vent means operative in response to movement of said movable element in said one direction by fluid from supply line means to vent said supply line means and to movement in said opposite direction by said low biasing force to close said vent means to regulate the pressure in said supply line means at a low value when said supply line means and device are disconnected,
 (i) bias control means having motor means and a fixed area orifice,
 (j) control valve means operated by a solenoid which is controlled by said selector valve means operatively connecting said supply line means through said orifice to said motor means to selectively supply to said motor means a pressure proportional to the pressure in said supply line means when said selector valve means connects said supply line means to said device, (k) and said motor means being operatively connected to said biasing means to provide during flow through said orifice to said motor means, a continuous, gradual change of said biasing force over an extended period of time to gradually change the pressure in said supply line means from said low value to a high value effective to establish full drive engagement over said extended period of time so that the pressure supplied to said device is at a pressure value above said low value and gradually increases until said high value is obtained to gradually and softly engage said drive engaging device.

5. The invention defined in claim 4 and said control valve means having vent means operative to vent said motor means when said motor means is disconnected from said supply line means to re-establish said low biasing force.

6. The invention defined in claim 5 and said solenoid having switch means controlled by said selector valve means operative to energize said solenoid when said supply line means and said device are disconnected to operate said control valve means to vent said motor means, and to de-energize said solenoid when said supply line means is connected to said device to operate said control valve means to connect said supply line means to said motor means.

7. In a transmission for an engine having a throttle movable from a closed to an open throttle position,
(a) a fluid operated drive engaging device,
(b) a source of fluid under pressure,
(c) supply line means connected to said source, first valve means for regulating the pressure in said supply line means in a high pressure range,
(d) means including selector valve means selectively operatively connecting said supply line means to said device,
(e) and second valve means selectively operatively controlled by said engine throttle and selector valve means effective to interrupt the pressure regulation by said first valve means and to regulate the pressure in said supply line means in a low pressure range when said supply line means and device are disconnected and said engine throttle is in said closed throttle position and upon opening of said engine throttle gradually increasing the pressure until pressure regulation by said first valve means is re-established so that the high regulated pressure is available for establishing drive engagement when supplied to said device, whereafter upon connecting said supply line means to said device the pressure supplied to said source is at the high pressure to prevent excessive slippage in said drive engaging device when drive engagement is effected during open engine throttle operation.

8. In a transmission for an engine having a throttle movable from a closed to an open throttle position,
(a) a fluid operated drive engaging device,
(b) a source of fluid under pressure,
(c) supply line means connected to said source,
(d) means including selector valve means selectively operatively connecting said supply line means to said device,
(e) and trimmer valve means selectively operatively controlled by said engine throttle effective when said engine throttle is in said closed throttle position to regulate the pressure in said supply line means at a low value, and upon opening of said engine throttle responsive to a pressure proportional to the pressure in said supply line means to gradually increase the pressure in said supply line means until a high value is obtained which would be effective to establish full drive engagement when supplied to said device so that upon connecting said supply line means to said device the pressure supplied to said device is at said high value to prevent excessive slippage in said drive engaging device when drive engagement is effected during open engine throttle operation.

9. In a transmission for an engine having a throttle movable from a closed to an open throttle position,
(a) a fluid operated drive engaging device,
(b) a source of fluid under pressure,
(c) supply line means connected to said source,
(d) means including selector valve means selectively operatively connecting said supply line means to said device,
(e) trimmer valve means having a movable element,
(f) means to connect said supply line means to said trimmer valve means to supply fluid to urge said movable element to move in one direction,
(g) biasing means providing a low biasing force to urge said movable element to move in the opposite direction,
(h) said trimmer valve means having vent means operative in response to movement of said movable element in said one direction by said fluid from said supply line means to vent said supply line means and to movement in said opposite direction by said low biasing force to close said vent means to regulate the pressure in said supply line means at a low value when said supply line means and device are disconnected,
(i) bias control means operatively connected to said biasing means,
(j) control valve means operated by a solenoid which is controlled by said engine throttle and selector valve means, operatively connecting said bias control means to said supply line means upon independent selective connection of said supply line means to said device by said selector valve means and opening of said engine throttle from said closed throttle position,
(k) and said bias control means when connected to said supply line means being responsive to a pressure proportional to the pressure in said supply line means to provide a continuous, gradual change of said biasing force over an extended period of time to gradually change said biasing force from said low biasing force to another biasing force to gradually change the pressure in said supply line means over said extended period of time from said low value at a gradual pressure change to a high value which would be effective to establish full drive engagement when supplied to said device.

10. In a transmission for an engine having a throttle movable from a closed to an open throttle position,
(a) a fluid operated drive engaging device,
(b) a source of fluid under pressure,
(c) supply line means connected to said source,
(d) means including selector valve means selectively operatively connecting said supply line means to said device,
(e) trimmer valve means having a movable element,
(f) means to connect said supply line means to said trimmer valve means to supply fluid to urge said movable element to move in one direction,
(g) biasing means providing a low biasing force to urge said movable element to move in the opposite direction,
(h) said trimmer valve means having vent means operative in response to movement of said movable element in said one direction by fluid from said supply line means to vent said supply line means and to movement in said opposite direction by said low biasing force to close said vent means to regulate the pressure in said supply line means at a low value when said supply line means and device are disconnected, (i) bias control means having motor means and a fixed area orifice, (j) control valve means operated by a solenoid which is controlled by said engine throttle and selector valve means, operatively connecting said supply line means through said orifice to said motor means to selectively supply to said motor means a pressure proportional to the pressure in said supply line means upon independent selective connection of said supply line means to said device by said selector valve means and opening of said engine throttle from said closed throttle position, (k) and said motor means being operatively connected to said biasing means to provide during flow through said orifice to said motor means a continuous, gradual change of said biasing force over an extended period of time to gradually change the pressure in said supply line means over said extended period of time from said low value to a high value which would be effective to establish full drive engagement when supplied to said device.

11. The invention defined in claim 10 and said control valve means having vent means operative to vent said motor means when said motor means is disconnected from said supply line means to re-establish said low biasing force.

12. The invention defined in claim 11 and said solenoid having first switch means controlled by said engine throttle and second switch means controlled by said selector valve means, said first and second switch means being closed to energize said solenoid when said supply line means and said device are disconnected and said engine throttle is in said closed position to operate said control valve means to vent said motor means, and being independently selectively opened to de-energize said solenoid upon independent selective connection of said supply line means to said device and opening of said engine throttle from said closed position to operate said control valve means to vent said motor means, and being independently selectively opened to de-energize said solenoid motor means.

13. In a transmission, (a) a plurality of fluid operated drive engaging devices, (b) supply port means, (c) selector valve means movable to and operable in a plurality of drive positions to selectively connect said supply port means to each of said devices and movable to and operable in a neutral position to disconnect said devices from said supply port means, (d) a source of fluid under pressure, (e) supply line means connecting said source to said supply port means, (f) regulator valve means to regulate the pressure in said supply line means at a high value, (g) and trimmer valve means selectively operatively controlled by said selector valve means effective to override said regulator valve means to regulate the pressure in said supply line means at a predetermined low value when said selector valve means is in said neutral position, and to gradually increase the pressure in said supply line means until said high value is obtained when said selector valve means is initially moved from said neutral position to one of said drive positions to connect said supply line means to one of said devices, so that the pressure initially supplied for drive engagement is a transient pressure which gradually increases until said high value is obtained to gradually and softly engage said one device, whereafter said regulator valve means is effective to regulate the pressure in said supply line means at said high value so that upon a subsequent engagement of another of said devices the pressure supplied for drive engagement is at said high value.

14. In a transmission, (a) a plurality of fluid operated drive engaging devices, (b) supply port means, (c) selector valve means movable to and operable in a plurality of drive positions to selectively connect said supply port means to each of said devices and movable to and operable in a neutral position to disconnect said devices from said supply port means, (d) a source of fluid under pressure, (e) supply line means connecting said source to said supply port means, (f) regulator valve means to regulate the pressure in said supply line means at a high value, (g) a trimmer valve having a movable element, (h) means to connect said supply line means to said trimmer valve to supply fluid to urge said movable element in one direction, (i) biasing means providing a low biasing force to urge said movable element to move in the opposite direction, (j) said trimmer valve having vent means operative in response to movement of said movable element in said one direction by said fluid from said supply line means to vent said supply line means and to movement in said opposite direction by said low biasing force to close said vent means to override said regulator valve means to regulate the pressure in said supply line means at a predetermined low value when said selector valve means is in said neutral position, (k) bias control means operatively connected to said biasing means, (l) movable valve means movable to selectively connect said supply line means to said bias control means, (m) a solenoid operatively controlled by said selector valve means operable to move said movable valve means to connect said supply line means to said bias control means when said selector valve means is initially moved from said neutral position to one of said drive positions to connect said supply line means to one of said devices, (n) and said bias control means being responsive to a pressure proportional to the pressure in said supply line means when said selector valve means is in said one drive position to provide a continuous, gradual change of said biasing force over an extended period of time to change said biasing force from said low biasing force to another biasing force to gradually change the pressure in said supply line means from said low value to said high value over said extended period of time to supply pressure to said one device at a gradual pressure change until and high value is obtained to gradually and softly engage said one device, whereafter said regulator valve means is effective to regulate the pressure in said supply line means at said high value so that upon a subsequent engagement of another of said devices the pressure supplied for drive engagement is at said high value.

15. In a transmission for an engine having a throttle movable from a closed to an open throttle position, (a) a plurality of fluid operated drive engaging devices, (b) supply port means, (c) selector valve means movable to and operable in a plurality of drive positions to selectively connect said supply port means to each of said devices and movable to and operable in a neutral position to disconnect said devices from said supply port means, (d) a source of fluid under pressure, (e) supply line means connecting said source to said supply port means, (f) regulator valve means to regulate the pressure in said supply line means at a high value, (g) trimmer valve means including bias control means selectively operatively controlled by said selector valve means and said engine throttle effective to override said regulator valve means to regulate the pressure in said supply line means at a predetermined low value when said selector valve means is in said neutral position and said engine throttle is in said closed throttle position, (h) and said bias control means being responsive to a pressure proportional to the pressure in said supply line means to gradually increase the pressure in said supply line means until said high value is obtained upon independent movement of said selector valve means from said neutral position to one of said drive positions and opening of said engine throttle from said closed throttle position, whereafter said regulator vlave means is effective to override said trimmer valve means to regulate the pressure in said supply line means at said high value.

16. In a transmission for an engine having an engine throttle movable from a closed to an open throttle position,
 (a) a plurality of fluid operated drive engaging devices,
 (b) supply port means,
 (c) selector valve means movable to and operable in a plurality of drive positions to selectively connect said supply port means to each of said devices and movable to and operable in a neutral position to disconnect said devices from said supply port means,
 (d) a source of fluid under pressure,
 (e) supply line means connecting said source to said supply port means,
 (f) regulator valve means to regulate the pressure in said supply line means at a high value,
 (g) trimmer valve means having a movable element,
 (h) means to connect said supply line means to said trimmer valve means to supply fluid to urge said movable element in one direction,
 (i) biasing means providing a low biasing force to urge said movable element to move in the opposite direction,
 (j) said trimmer valve means having vent means operative in response to movement of said movable element in said one direction by said fluid from said supply line means to vent said supply line means and to movement in said opposite direction by said low biasing force to close said vent means to override said regulator valve means to regulate the pressure in said supply line means at a predetermined low value when said selector valve means is in said neutral position and said engine throttle is in said closed throttle position,
 (k) bias control means having motor means and a fixed area orifice,
 (l) movable valve means movable to selectively connect said supply line means through said orifice to said motor means a pressure proportional to the pressure in said supply line means,
 (m) a solenoid operatively controlled by said selector valve means and said engine throttle operable to move said movable valve means to independently selectively connect and disconnect said supply line means and said motor means upon opening of said engine throttle from said closed throttle position and movement of said selector valve means from said neutral position to one of said drive positions to connect said supply line means to one of said devices,
 (n) and said motor means being operatively connected to said biasing means to provide during flow through said orifice to said motor means a continuous, gradual change of said biasing force over an extended period of time to change said biasing force from said low biasing force to another biasing force to gradually change the pressure in said supply line means from said low value to said high value over said extended period of time, whereafter said regulator valve means is effective to regulate the pressure in said supply line means at said high value.

17. The invention defined in claim 16 and said control valve means having vent means operative to vent said motor means when said motor means is disconnected from said supply line means to re-establish said low biasing force.

18. The invention defined in claim 17 and said solenoid having throttle switch means controlled by said engine throttle and neutral switch means controlled by said selector valve means, said throttle switch means and neutral switch means being closed to energize said solenoid when said engine throttle is in said closed throttle position and said selector valve means is in said neutral position, and independently selectively opened to de-energize said solenoid upon independent selective opening of said engine throttle from said closed throttle position and movement of said selector valve means from said neutral position to any of said drive positions, said solenoid when energized operable to move said movable valve means to disconnect said motor means and supply line means to vent said motor means and when de-energized to connect said motor means and supply line means.

References Cited by the Examiner
UNITED STATES PATENTS 3,053,116  9/1962  Christenson et al.
3,091,980  6/1963  Black.

DAVID J. WILLIAMOWSKY, *Primary Examiner.*
DON A. WAITE, *Examiner.*
M. H. FREEMAN, T. C. PERRY, *Assistant Examiners.*

UNITED STATES PATENT OFFICE
CERTIFICATE OF CORRECTION

Patent No. 3,293,935                     December 27, 1966

Robert M. Tuck et al.

It is hereby certified that error appears in the above numbered patent requiring correction and that the said Letters Patent should read as corrected below.

Column 2, line 29, after "provide" insert -- in --; line 43, for "deliverying" read -- delivering --; line 53, for "valve", first occurrence, read -- value --; column 4, line 6, after "second" insert -- reverse --; column 6, line 28, beginning with "line 141" strike out all to and including "high ratio" in line 29, same column 6, and insert instead -- overdrive ratio line 144 via line 142 and the high ratio line 141 are connected to the exhaust line 158 while the --; column 7, line 14, before "initial" insert -- the --; line 52, for "on" read -- in --; column 8, line 27, for "had" read -- hand --; column 9, line 15, for "spring the" read -- the spring --; line 19, after "ratio" insert -- the --; line 20, for "value" read -- valve --; column 10, line 35, after "governor" insert -- which --; line 37, for "in" read -- of --; column 11, line 7, after "drive" insert -- ratio --; line 9, strike out "the", first occurrence; line 62, after "selector" insert -- valve --; line 64, after "said", second occurrence, insert -- supply --; column 12, line 61, after "from" insert -- said --; column 15, line 39, for "vent said motor means, and being inde-" read -- connect said supply line means to said --; column 16, line 52, for "and" read -- said --; column 17, line 15, for "vlave" read -- valve --.

Signed and sealed this 26th day of September 1967.

(SEAL)
Attest:

ERNEST W. SWIDER                         EDWARD J. BRENNER
Attesting Officer                        Commissioner of Patents